(12) United States Patent
Shono et al.

(10) Patent No.: US 6,298,292 B1
(45) Date of Patent: Oct. 2, 2001

(54) VEHICLE HEIGHT ADJUST CONTROL APPARATUS AND METHOD

(75) Inventors: Shoichi Shono, Nishikamo-gun; Atushi Sato, Susono, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/166,097

(22) Filed: Oct. 5, 1998

(30) Foreign Application Priority Data

Dec. 18, 1997 (JP) .................................................. 9-349119

(51) Int. Cl.$^7$ .................................................. B60G 17/00
(52) U.S. Cl. ............................ 701/37; 280/6 R; 280/703; 280/711; 280/772; 73/11.07; 73/118.1; 188/299
(58) Field of Search ............................... 701/37; 280/707, 280/840; 264/424.05; 188/282; 73/11.07

(56) References Cited

U.S. PATENT DOCUMENTS

| | | | |
|---|---|---|---|
| 4,718,695 | * | 1/1988 | Kawagoe ............................ 280/707 |
| 4,975,849 | * | 12/1990 | Ema ................................. 364/424.05 |
| 5,097,419 | * | 3/1992 | Lizell ............................... 364/424.05 |
| 5,141,245 | * | 8/1992 | Kamimura et al. .................. 280/707 |
| 5,294,146 | * | 3/1994 | Tabata et al. ........................ 280/707 |
| 5,347,457 | * | 9/1994 | Tanaka et al. .................... 364/424.05 |
| 5,517,847 | * | 5/1996 | Campbell et al. ................... 73/11.07 |

FOREIGN PATENT DOCUMENTS

| | | |
|---|---|---|
| A-54-142725 | 11/1979 | (JP). |
| A-58-36712 | 3/1983 | (JP). |
| A-58-36713 | 3/1983 | (JP). |
| A-60-261715 | 12/1985 | (JP). |
| A-4-50007 | 2/1992 | (JP). |
| A-4-55113 | 2/1992 | (JP). |

\* cited by examiner

*Primary Examiner*—William A. Cuchlinski, Jr.
*Assistant Examiner*—Tuan C To
(74) *Attorney, Agent, or Firm*—Oliff & Berridge PLC (57) ABSTRACT

In a vehicle height adjust control apparatus and method for changing the vehicle height using actuators, the incidence of noises produced during the switching of actuators is reduced and good durability or long service life of the actuators is achieved. Based on a vehicle speed detected by a vehicle speed sensor, a microcomputer calculates a forward-backward acceleration. If the forward-backward acceleration is equal to or less than a first predetermined value, a vehicle height deviating from a target vehicle height is adjusted by a normal operation. If the forward-backward acceleration is greater than the first predetermined value but not greater than a second predetermined value, the determination for starting vehicle height adjustment is prevented. If the forward-backward acceleration is greater than the second predetermined value, the vehicle height adjustment is suspended. Therefore, the apparatus allows the second predetermined value to be set to a large value so as to reduce the frequency of the suspension and restart of vehicle height adjustment while reliably preventing the start of vehicle height adjustment when necessary, thereby reducing the frequency of actuator switching operations.

12 Claims, 9 Drawing Sheets

VEHICLE HEIGHT ADJUST CONTROL APPARATUS AND METHOD

INCORPORATION BY REFERENCE

The disclosure of Japanese Patent Application No. HEI 9-349119 filed on Dec. 18, 1997 including the specification, drawings and abstract is incorporated herein by reference in its entirety.

BACKGROUND OF THE INVENTION

1. Field of the Invention

The present invention relates to a vehicle height adjust control apparatus and method that maintains the vehicle height at a target vehicle height.

2. Description of the Related Art

In a vehicle height adjust control apparatus that adjusts the vehicle height so that the vehicle height is maintained at a target vehicle height, as described in, for example, Japanese Patent Application Laid-Open Nos. SHO 58-36712 and 58-36713, the vehicle height changing control is allowed when the vehicle acceleration in the fore-to-aft direction or a lateral direction is less than a predetermined value, and the vehicle height changing control is prevented when the vehicle acceleration becomes greater than the predetermined value.

Such an apparatus allows a certain reduction of the frequency of the performance of vehicle height adjustment in response to a temporary change in the vehicle height at various portions of the vehicle body which is caused by a change in the vehicle acceleration in the for-to-aft or lateral direction. If the predetermined value used for the determination regarding the acceleration is set to a reduced value, the frequency of the suspension and restart of vehicle height adjustment increases. Conversely, if the predetermined value is set to an increased value, the frequency of the performance of vehicle height adjustment caused by a change in the acceleration cannot be reduced. In either case, the frequency of actuator switching operations increases, so that the incidence of noises produced during the switching of actuators increases. Moreover, the durability or service life of the actuators decreases due to the frequent actuator switching operations.

SUMMARY OF THE INVENTION

Accordingly, it is an object of the present invention to provide a vehicle height adjust control apparatus and method wherein the incidence of noises produced during the switching of actuators is reduced and good durability or long service life of the actuators is achieved, by minimizing the frequency of actuator switching operations.

According to one aspect of the invention, there is provided a vehicle height adjust control apparatus including an actuator capable of changing a height of a vehicle, a vehicle height detection device for detecting a vehicle height, and a start determining device for, if an amount of deviation of the vehicle height detected by the vehicle height detection device from a target vehicle height increases to a predetermined level, making a start determination that vehicle height adjustment is to be started. A vehicle height changing device is provided for, when the determination that vehicle height adjustment is to be started is made by the start determining device, changing the vehicle height by controlling the actuator so that the vehicle height detected by the vehicle height detection device becomes substantially equal to the target vehicle height. A physical quantity detection device is provided for detecting a physical quantity that indicates a movement of the vehicle that changes a posture of the vehicle. A start determination prevention device is provided for, if the physical quantity detected by the physical quantity detection device is greater than a first predetermined value, preventing the start determination from being made by the start determining device. A suspension device is provided for, if the physical quantity detected by the physical quantity detection device is greater than a second predetermined value that is greater than the first predetermined value, suspending the changing of the vehicle height by the vehicle height changing device.

The vehicle height adjust control apparatus may further have the following construction. That is, the start determining device is designed so that a value indicating the amount of deviation of the vehicle height detected by the vehicle height detection device from the target vehicle height is compared with a third predetermined value and, when the value indicating the amount of deviation becomes greater than the third predetermined value, it is determined that vehicle height adjustment is to be started. The start determination prevention device includes a comparison prevention device for, if the physical quantity detected by the physical quantity detection device is greater than the first predetermined value, preventing comparison of the value indicating the amount of deviation with the third predetermined value from being performed by the start determining device.

In the vehicle height adjust control apparatus of the invention, if the detected physical quantity is greater than the first predetermined value but not greater than the second predetermined value, the start determination prevention device prevents the start determination that vehicle height adjustment is to be started from being made by the start determining device. That is, this operation does not suspend a vehicle height adjusting operation started when the physical quantity was smaller than the first predetermined value. However, if the physical quantity is greater than the first predetermined value, the start of a new vehicle height adjusting operation is prevented. If the physical quantity is greater than the second predetermined value, the vehicle height adjustment is suspended. Therefore, although the second predetermined value is set to a large value so as to reduce the frequency of the suspension and restart of vehicle height adjustment caused by the suspension device on the basis of changes in the physical quantity, the frequency of the performance of vehicle height adjustment in response to changes in the vehicle height accompanied by changes in the physical quantity can be reduced. Consequently, the invention reduces the frequency of actuator switching operations in total, and therefore reduces the incidence of noises produced during the actuator switching and achieves good durability or long service life of the actuator.

According to another aspect of the invention, there is provided a vehicle height adjust control apparatus including an actuator capable of changing a height of a vehicle, a vehicle height detection device for detecting a vehicle height, a start determining device for comparing a value indicating an amount of deviation of the vehicle height detected by the vehicle height detection device from a target vehicle height with a third predetermined value and for, when the value indicating the amount of deviation becomes greater than the third predetermined value, making a start determination that vehicle height adjustment is to be started, a vehicle height changing device for, when the start determination that vehicle height adjustment is to be started is made by the start determining device, changing the vehicle height by controlling the actuator so that the vehicle height detected by the vehicle height detection device becomes substantially equal to the target vehicle height, a physical quantity detection device for detecting a physical quantity that indicates a movement of the vehicle that changes a posture of the vehicle, a comparison value changing device for, if the physical quantity detected by the physical quantity detection device is greater than a first predetermined value, setting the third predetermined value used by the start determining device, to a value that is greater than a value that is set as the third predetermined value if the physical quantity is equal to or less than the first predetermined value, and a suspension device for, if the physical quantity detected by the physical quantity detection device is greater than a second predetermined value that is greater than the first predetermined value, suspending the changing of the vehicle height by the vehicle height changing device.

In the vehicle height adjust control apparatus of the second aspect of the invention, if the detected physical quantity is greater than the first predetermined value, the comparison value changing device sets the third predetermined value used by the start determining device to a value that is greater than a value that is set as the third predetermined value if the physical quantity is equal to or less than the first predetermined value. Therefore, the start of vehicle height adjustment becomes less likely to be made in a case where the detected physical quantity is greater than the first predetermined value. Consequently, through the cooperation of the comparison value changing device and the suspension device, it becomes possible to reduce the frequency of actuator switching operations and therefore to reduce the incidence of noises produced during the switching of actuators and achieve good durability or long service life of the actuators.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
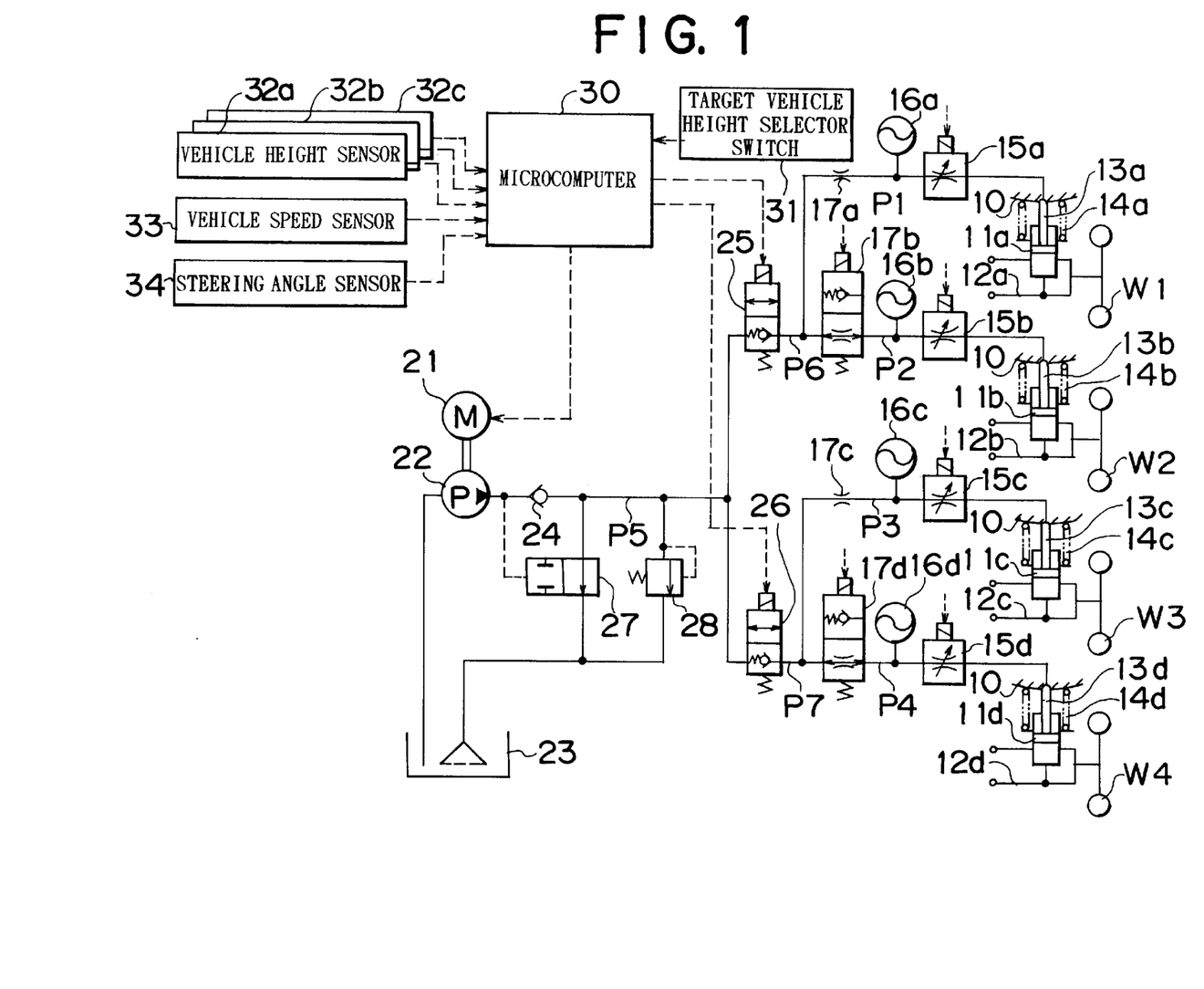
FIG. 1 is a schematic diagram of the overall construction of a vehicle height adjust control apparatus according to a preferred embodiment and various modifications of the invention.

A preferred embodiment of the present invention will be described in detail hereinafter with reference to the accompanying drawings. FIG. 1 is a schematic illustration of a vehicle height adjust control apparatus according to an embodiment.

The vehicle height adjust control apparatus has hydraulic cylinders 11a–11d that form hydraulic actuators for setting vehicle heights, near left and right front wheels W1, W2 and left and right rear wheels W3, W4, respectively. Each of the hydraulic cylinders 11a–11d is connected at its lower end to a lower arm 12a–12d connecting to the corresponding one of the wheels W1–W4. A piston rod 13a–13d of each hydraulic cylinder 11a–11d protrudes from an upper surface thereof. Upper end portions of the piston rods 13a–13d are fixed to a vehicle body 10. Hydraulic fluid is supplied to and discharged from the hydraulic cylinders 11a–11d through fluid passages P1–P4, respectively. In accordance with supply and discharge of hydraulic fluid, the hydraulic cylinders 11a–11d change the vehicle heights at the respective wheel positions.

Coil springs 14a–14d are disposed between the vehicle body 10 and the hydraulic cylinders 11a–11d, respectively. The fluid passages P1–P4 are provided with variable orifices 15a–15d, respectively. Accumulators 16a–16d are connected to the fluid passages P1–P4, respectively. In cooperation with the coil, springs 14a–14d, the variable orifices 15a–15d and the accumulators 16a–16d, the hydraulic cylinders 11a–11d elastically support the vehicle body 10 relative to the wheel W1–W4, and also function as shock absorbers for damping oscillations of the vehicle body 10. The variable orifices 15a–15d are, for example, electrically controlled so as to vary their orifice openings. The control of the orifice openings of the variable orifices 15a–15d is not directly related to the invention, and will not be described.

The fluid passages P1, P2 and the fluid passages P3, P4 are connected, at their ends opposite from the hydraulic cylinders 11a, 11b and 11c, 11d, to common fluid passages, respectively. Therefore, hydraulic fluid is collectively supplied to and discharged from the hydraulic cylinders 11a, 11b through the fluid passages P1, P2, and hydraulic fluid is collectively supplied to and discharged from the hydraulic cylinders 11c, 11d through the fluid passages P3, P4. The fluid passages P2, P4 are provided with gate valves 17b, 17d formed by, for example, electromagnetic changeover valves, respectively. The gate valves 17b, 17d are in a conveying state as indicated in FIG. 1 when not energized, and they are switched to a non-conveying state when energized. The gate valves 17b, 17d are energized when the vehicle body 10 rolls, for example, at the time of cornering or turning, so as to prevent communication between the hydraulic cylinders 11a and 11b and communication between the hydraulic cylinders 11c and 11d, respectively. The operation of the gate valves 17b, 17d is not directly relevant to the invention, and the description below will be made on assumption that the gate valves 17b, 17d are always in the conveying state as indicated in FIG. 1. The fluid passages P1, P3 are provided with invariable orifices 17a, 17c, respectively, for providing the fluid passages P1, P3 with a passage resistance equivalent to that provided by orifice openings that are formed by the gate valves 17b, 17d when in the conveying state.

A hydraulic pressure supply-discharge device has a hydraulic pump 22 that is driven by an electric motor 21. The hydraulic pump 22 draws hydraulic fluid from a reservoir tank 23, and ejects it into a fluid passage P5 through a check valve 24. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 25, 26 that are formed by, for example, electromagnetic changeover valves, respectively. The leveling valves 25, 26 remain in a non-conveying state as indicated in FIG. 1 when not energized, and they are switched to a conveying state when energized. If the hydraulic pressure in the fluid passages P1–P4 becomes abnormally high, the leveling valves 25, 26 allow discharge of hydraulic fluid from the fluid passages P1–P4 into the fluid passage P5 for protection of the apparatus even while they are in the non-conveying state.

A discharge valve 27 and a relief valve 28 are disposed between the fluid passage P5 and the reservoir tank 23. The discharge valve 27 is normally kept in a conveying state, and mechanically switched to a non-conveying state when the ejecting pressure of the hydraulic pump 22 increases. The passage area of the discharge valve 27 when the discharge valve 27 is kept in the conveying state is at least twice as large as the passage area of the leveling valves 25, 26 when they are in the conveying state. The relief valve 28 is normally kept in a non-conveying state. Only when the hydraulic pressure in the fluid passage P5 becomes very high, the relief valve 28 is switched to a conveying state to let hydraulic fluid out of the fluid passage P5 into the reservoir tank 23 for protection of the apparatus.

The electric motor 21 and the leveling valves 25, 26 are connected to a microcomputer 30 that forms an electric control device. The microcomputer 30 executes a main program illustrated in FIG. 2 (including subroutines illustrated in FIGS. 3 and 4) and a drive control program illustrated in FIG. 5 repeatedly every predetermined short length of time, thereby controlling the supply and discharge of hydraulic fluid with respect to the hydraulic cylinders 11a–11d. The microcomputer 30 is connected to a target vehicle height selector switch 31, vehicle height sensors 32a–32c and a vehicle speed sensor 33.

The target vehicle height selector switch 31 is a switch that is operated by an occupant to select vehicle heights. The vehicle height sensors 32a, 32b are disposed between the vehicle body 10 and the lower arms 12a, 12b at the left and right front wheels W1, W2, respectively. Each of the vehicle height sensors 32a, 32b detects the height of the vehicle body 10 at the left or right front wheel W1, W2 relative to a road surface (or an under-spring member), and outputs a detection signal indicating the actual vehicle height Hf1, Hf2. The vehicle height sensor 32c is disposed at a transversely middle position in a rear portion of the vehicle body 10, between the vehicle body 10 and a frame (corresponding to an under-spring member not shown) connecting the lower arms 12c and 12d. The vehicle height sensor 32c detects the height of the vehicle body 10 at the transversely middle position in the rear portion of the vehicle, relative to the road surface (or the under-spring member), and outputs a detection signal indicating the actual vehicle height Hr. The vehicle speed sensor 33 detects a vehicle speed V and outputs a detection signal indicating the vehicle speed V.

The operation of the thus-constructed embodiment will be described. When the ignition switch (not shown) is turned on, the microcomputer 30 executes a program (not illustrated) to initially set "0" in various flags used in programs described below, and then starts to execute the main program illustrated in FIG. 2 and the drive control program illustrated in FIG. 5 repeatedly every predetermined short period.

Figure 2:
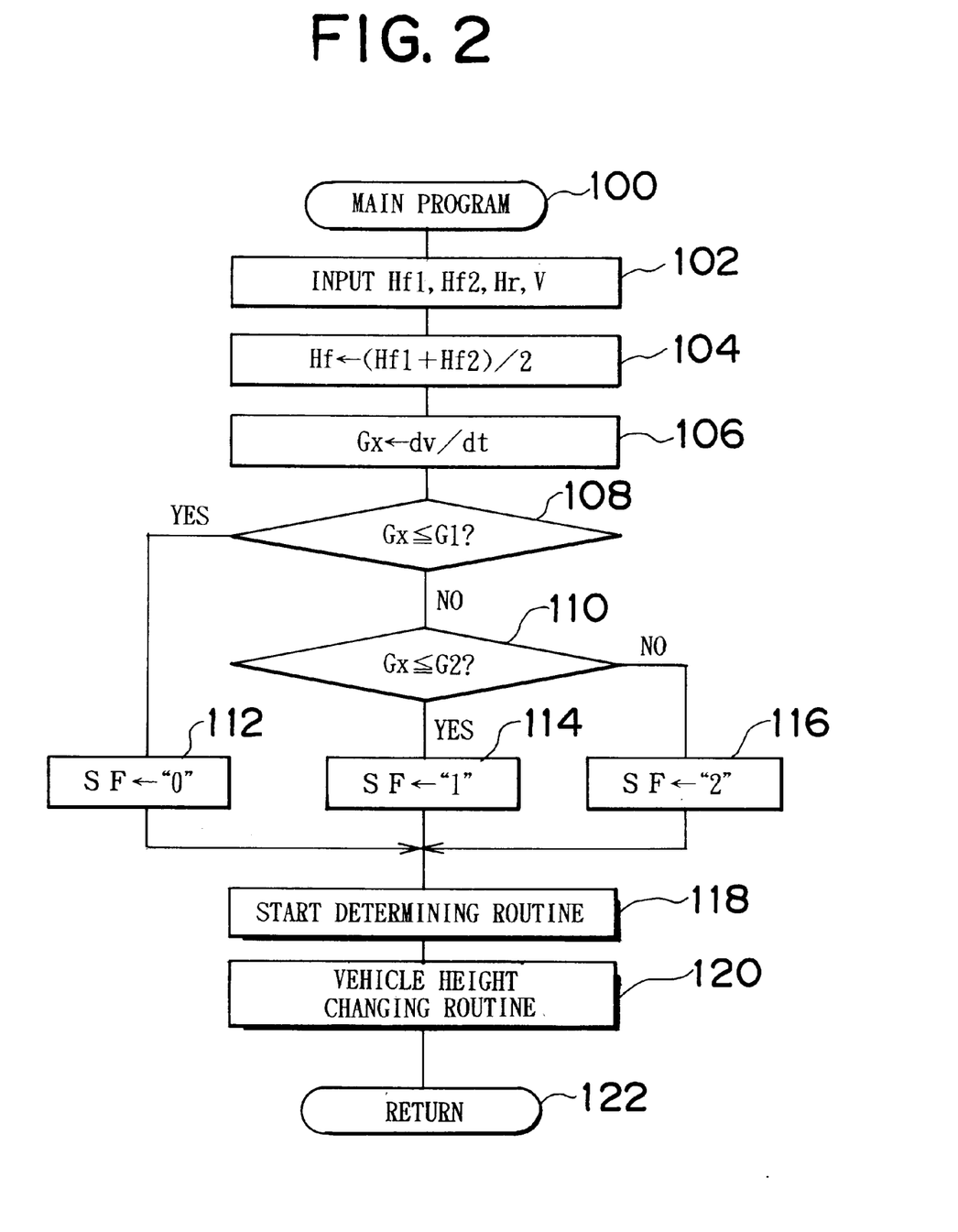
FIG. 2 is a flowchart illustrating a main program executed by the microcomputer shown in FIG. 1.

When the main program is started in step 100, the microcomputer 30 receives inputs of detection signals from the vehicle height sensors 32a–32c and the vehicle speed sensor 33 indicating the actual vehicle heights Hf1, Hf2, Hr and the vehicle speed V in step 102. If the actual vehicle heights Hf1, Hf2, Hr and the vehicle speed V from the sensors 32a–32c, 33 have instantaneous changes and therefore are not suitable for direct use in the operations by the microcomputer 30, the signals of the actual vehicle heights Hf1, Hf2, Hr and the vehicle speed V are subjected to low-pass filter processing.

Subsequently in step 104, the microcomputer 30 calculates an actual vehicle height Hf(=(Hf1+Hf2)/2) of a front portion of the vehicle body 10 by averaging the actual vehicle heights Hf1, Hf2. In step 106, the microcomputer 30 calculates a forward-backward acceleration Gx by time differentiation of the vehicle speed V. In the process of steps 108–116, a state of the vehicle is detected on the basis of the forward-backward acceleration Gx, and a state flag SF that indicates the detected state is set to the corresponding one of "0", "1" and "2". If the forward-backward acceleration Gx is equal to or less than a positive predetermined value G1, the state flag SF is set to "0". If the forward-backward acceleration Gx is greater than predetermined value G1 but not greater than a positive predetermined value G2, the state flag SF is set to "1". If the forward-backward acceleration Gx is greater than the predetermined value G2, the state flag SF is set to "2". The predetermined values G1, G2 are predetermined so that the relationship G2>G1 is established. For example, the predetermined values G1, G2 are pre-set to 0.1 G(0.98 m/s$^2$) and 0.2 G (1.96 m/s$^2$), respectively.

After that, the microcomputer 30 executes a start determining routine in step 118 and a vehicle height changing routine in step 120, and ends the execution of the main program in step 122.

Figure 3:
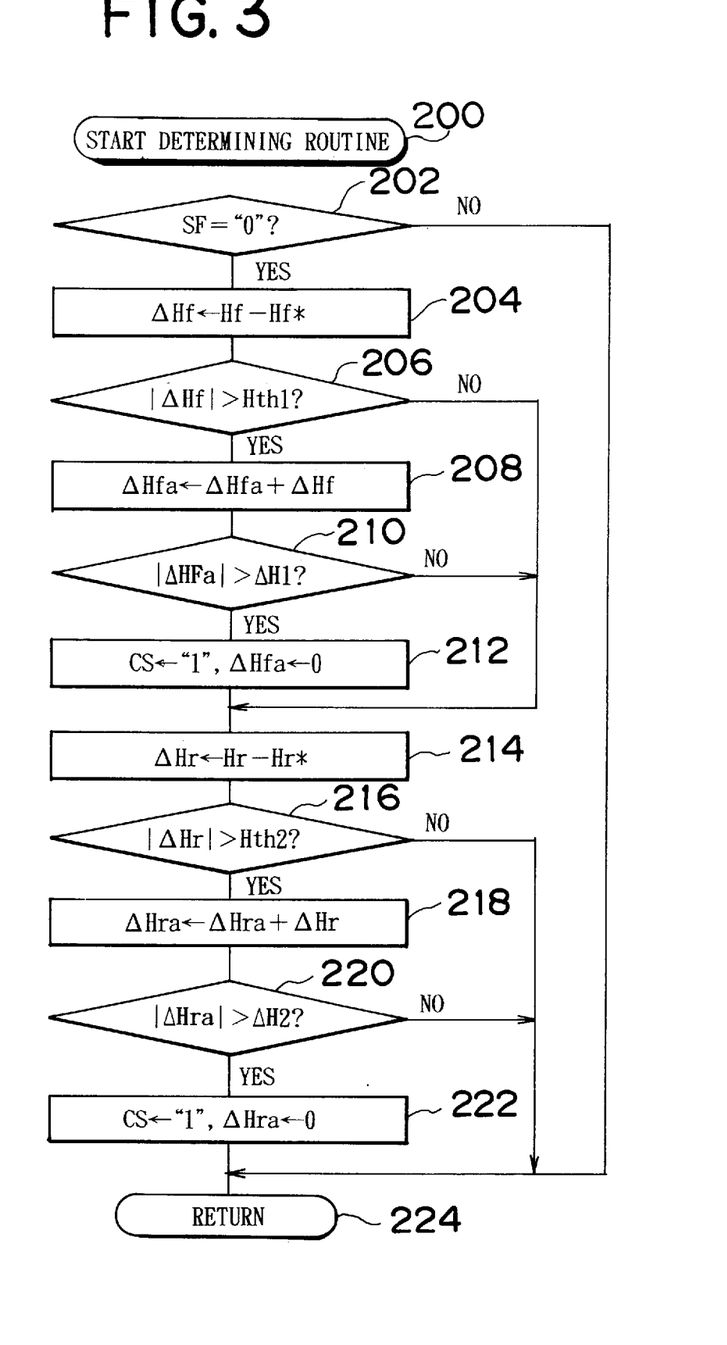
FIG. 3 is a flowchart illustrating in detail an example of the start determining routine indicated in FIG. 2.

The start determining routine is illustrated in detail in FIG. 3. When the routine is started in step 200, the microcomputer 30 determines in step 202 whether the state flag SF is "0".

First, operations performed in a case where the forward-backward acceleration Gx is equal to or less than the predetermined value G1 so that the state flag SF is set to "0", will be described. In this case, the determination in step 202 becomes affirmative. Subsequently in step 204, the microcomputer 30 calculates a vehicle height deviation ΔHf(=Hf—Hf*) by subtracting the target vehicle height Hf* of the front portion of the vehicle body 10 from the actual vehicle height Hf of the front portion thereof detected in step 204. The target vehicle height Hf* is set in accordance with a selected state the target vehicle height selector switch 31 by execution of a program (not illustrated), when the target vehicle height selector switch 31 is operated. In an initial period, the target vehicle height Hf* is set to a value corresponding to the state of the target vehicle height selector switch 31 at the time of the turning-on of the ignition switch. Subsequently in step 206, the microcomputer 30 determines whether the absolute value |ΔHf| of the vehicle height deviation ΔHf is greater then a positive threshold Hth1 determined beforehand. If the absolute value |ΔHf| is equal to or less than the threshold Hth1, the microcomputer 30 makes a negative determination in step 206, and proceeds to step 214.

In step 214, the microcomputer 30 calculates a vehicle height deviation ΔHr(=Hr−Hr*) by subtracting the target vehicle height Hr* of the rear portion of the vehicle body 10 from the actual vehicle height Hr of the rear portion thereof. The target vehicle height Hr* is set simultaneously with the target vehicle height Hf* of the front portion of the vehicle body 10. Subsequently in step 216, it is determined whether the absolute value |ΔHr| of the vehicle height deviation ΔHr is greater than a positive threshold Hth2 determined beforehand. If the absolute value |ΔHr| is equal to or less than the threshold Hth2, the microcomputer 30 makes a negative determination in step 216, and then ends the execution of the start determining routine in step 224.

Figure 4:
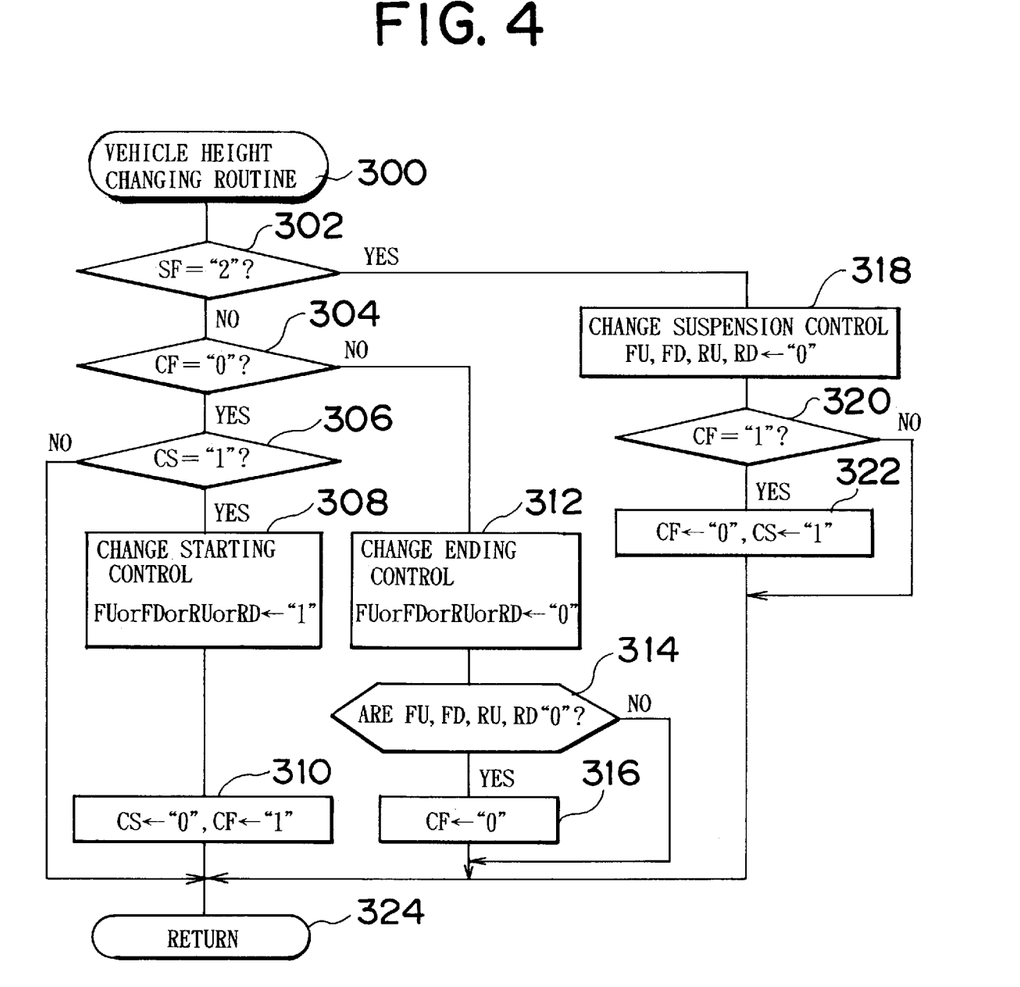
FIG. 4 is a flowchart illustrating in detail an example of the vehicle height changing routine indicated in FIG. 2.

After executing the start determining routine, the microcomputer 30 executes the vehicle height changing routine illustrated in FIG. 4. After starting the routine in step 300, the microcomputer 30 determines in step 302 whether the state flag SF is "2". Since the state flag SF has been set to "0" in this case, the microcomputer 30 makes a negative determination in step 302, and proceeds to step 304. In step 304, it is determined whether a changing flag CF is "0". Since the changing flag CF is initially set to "0", the microcomputer 30 makes an affirmative determination in step 304, and proceeds step 306. In step 306, it is determined whether a change start flag CS is "1". Since the change start flag CS is initially set to "0", the microcomputer 30 makes a negative determination in step 306, and then ends the execution of the vehicle height changing routine in step 324.

Figure 5:
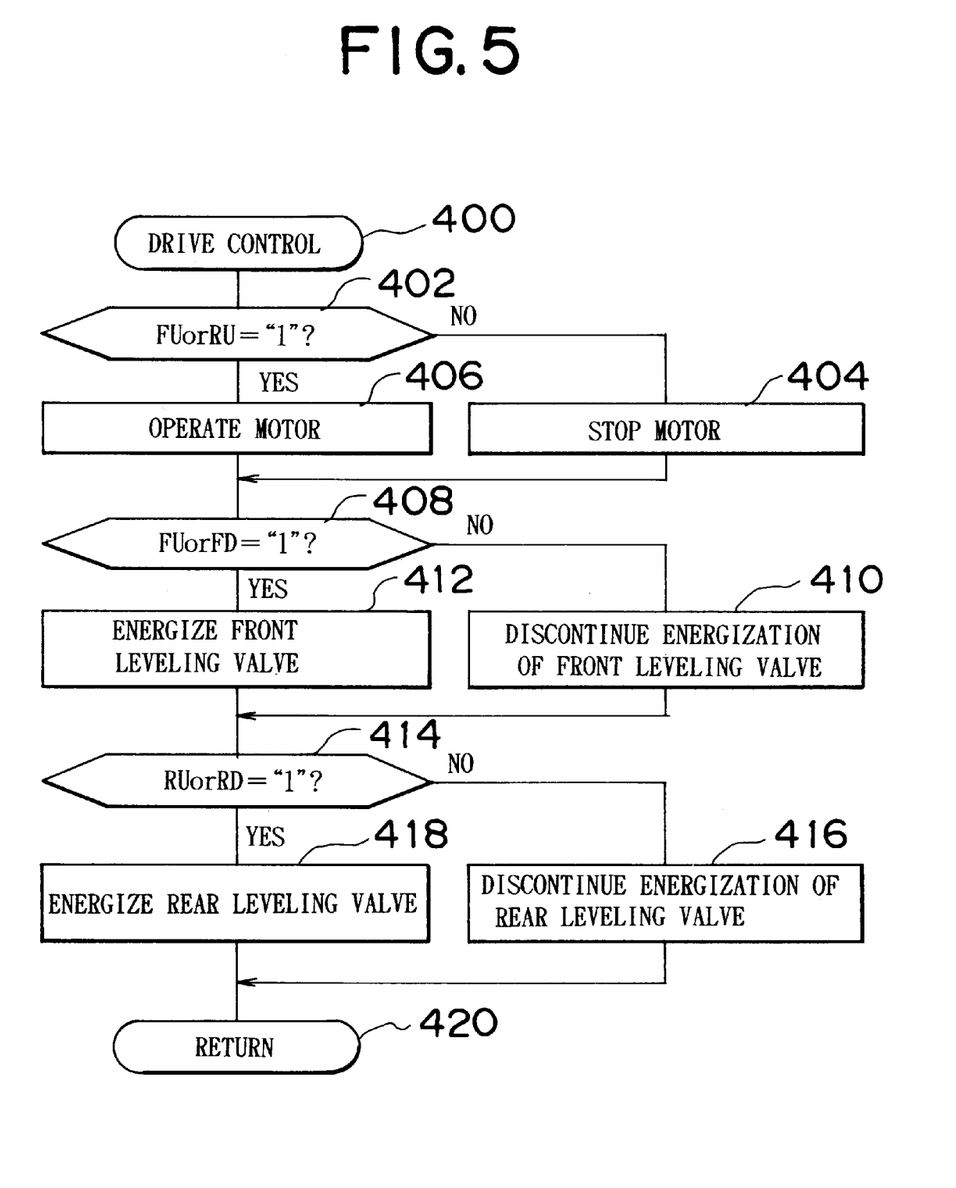
FIG. 5 is a flowchart illustrating an example of a drive control program executed by the microcomputer shown in FIG. 1.

In addition to the execution of the main program, the microcomputer 30 executes the drive control program illustrated in FIG. 5. When the execution of the drive control program is started in step 400, the process of steps 402 through 418 controls the electric motor 21 and the leveling valves 25, 26 corresponding to the set states of a front raising flag FU, a front lowering flag FD, a rear raising flag RU and a rear lowering flag RD. These flags indicate performance of the raising and lowering controls of the front and rear portions of the vehicle body 10, respectively. In this case, since all the flags FU, FD, RU, RD are kept at "0" by the initial setting, the microcomputer 30 stops the electric motor 21 by the process of steps 402, 404, and sets the leveling valve 25 to the non-energized state by the process of steps 408, 410, and sets the leveling valve 26 to the non-energized state by the process of 414, 416. Execution of the drive control program ends in step 420. As a result, the hydraulic pressure in the hydraulic cylinders 11a, 11b is maintained, and the hydraulic pressure in the hydraulic cylinders 11c, 11d is maintained, so that the vehicle heights of the front and rear portions of the vehicle body 10 are maintained at levels where they have been.

Next described will be an operation performed in a case where the actual vehicle heights Hf, Hr of the front and rear portions of the vehicle body 10 are changed due to a change in the number of occupants, a change in the baggage weight, and the like. If the actual vehicle height Hf of the front portion of the vehicle body 10 increases or decreases so that the absolute value |ΔHf| of the vehicle height deviation ΔHf becomes greater than the threshold Hth1, the microcomputer 30 makes an affirmative determination in step 206 in the start determining routine in FIG. 3. Subsequently in step 208, the microcomputer 30 calculates an accumulated value ΔHfa of vehicle height deviations ΔHf by performing an arithmetic operation represented by expression 1.

$$\Delta Hfa = \Delta Hfa + \Delta Hf \tag{1}$$

Until the absolute value |ΔHfa| of the accumulated value ΔHfa becomes greater than a predetermined positive value ΔH1, the microcomputer 30 repeatedly makes a negative determination in step 210. Because the accumulated value ΔHfa is initially cleared to zero and because step 208 is executed every predetermined time, the accumulated value ΔHfa is substantially equivalent to the integral of the vehicle height deviation ΔHf (the amount of deviation of the actual vehicle height Hf from the target vehicle height Hf*). If the absolute value |ΔHfa| of the accumulated value ΔHfa becomes greater than the predetermined value ΔH1, the microcomputer 30 makes an affirmative determination in step 210. Then in step 212, the microcomputer 30 sets the change start flag CS to "1", and clears the accumulated value ΔHfa to zero.

If the actual vehicle height Hr of the rear portion of the vehicle body 10 is changed so that the absolute value |ΔHr| of the vehicle height deviation ΔHr of the rear portion becomes greater than the threshold Hth2, the microcomputer 30 makes an affirmative determination in step 216, and proceeds to step 218. In step 218, the microcomputer 30 calculates an accumulated value ΔHra of vehicle height deviations ΔHr by performing an arithmetic operation represented by expression 2.

$$\Delta Hra = \Delta Hra + \Delta Hr \tag{2}$$

Until the absolute value |ΔHra| of the accumulated value ΔHra becomes greater than a predetermined positive value ΔH2, the microcomputer 30 repeatedly makes a negative determination in step 220. Because the accumulated value ΔHra is initially cleared to zero and because step 218 is executed every predetermined time, the accumulated value ΔHra is substantially equivalent to the integral of the vehicle height deviation ΔHr (the amount of deviation of the actual vehicle height Hr from the target vehicle height Hr*). If the absolute value |ΔHra| of the accumulated value ΔHra becomes greater than the predetermined value ΔH2, the microcomputer 30 makes an affirmative determination in step 220. Then in step 222, the microcomputer 30 sets the change start flag CS to "1", and clears the accumulated value ΔHra to zero.

When the change start flag CS has been set to "1" in this manner, the microcomputer 30 makes an affirmative determination in step 306 in the vehicle height changing routine illustrated in FIG. 4, and then executes a change starting control routine of step 308. In the change starting control routine, one or two of the front raising flag FU, the front lowering flag FD, the rear raising flag RU and the rear lowering flag RD are set to "1". More specifically, if the target vehicle height selector switch 31 is operated so that both of the previously-set vehicle heights Hf, Hr of the front and rear portions of the vehicle body 10 now considerably deviate upward or downward from the target vehicle heights Hf*, Hr*, or if the load on the entire vehicle body 10 is changes so that both actual vehicle heights Hf, Hr of the front and rear portions of the vehicle body 10 deviate upward or downward from the target vehicle heights Hf*, Hr*, the front raising flag FU and the rear raising flag RU are set to "1" and the front lowering flag FD and the rear lowering flag RD are maintained at "0"; alternatively, the front lowering flag FD and the rear lowering flag RD are set to "1" and the front raising flag FU and the rear raising flag RU are maintained at "0". If the load on a portion of the vehicle body 10 is changed so that only one of the actual vehicle height Hf, Hr deviates upward or downward from the corresponding target vehicle height Hf* or Hr*, the corresponding one of the front raising flag FU, the front flowering flag FD, the rear raising flag RU and the rear lowering flag RD is set to "1", and the other flags are maintained at "0". In this operation, it never happens that one of the front raising flag FU and the rear raising flag RU and one of the front lowering flag FD and the rear lowering flag RD are simultaneously set to "1".

After executing step 308, the microcomputer 30 sets the change start flag CS back to "0" and sets the changing flag CF to "1" in step 310, and ends the execution of the vehicle height changing routine in step 324.

When the drive control program of FIG. 5 is executed in the conditions set as described above, the electric motor 21 is driven by the process of steps 402, 406 if both or one of the front raising flag FU and the rear raising flag RU has been set to "1". Therefore, the hydraulic pump 22 draws fluid from the reservoir 23 and ejects it into the fluid passage P5. In response to the ejecting fluid pressure, the discharge valve 27 is switched to the non-conveying state. If the front raising flag FU is "1", the leveling valve 25 is energized by the process of steps 408, 412, so that hydraulic fluid, ejected by the hydraulic pump 22, is supplied to the hydraulic cylinders 11a, 11b through the fluid passages P6, P1, P2. Therefore, the hydraulic cylinders 11a, 11b start to raise the positions of the vehicle body 10 relative to the left and right front wheels W1, W2. If the rear raising flag RU is "1", the leveling valve 26 is energized by the process of steps 414, 418, so that hydraulic fluid, ejected by the hydraulic pump 22, is supplied to the hydraulic cylinders 11c, 11d through the fluid passages P7, P3, P4. Therefore, the hydraulic cylinders 11c, 11d start to raise the positions of the vehicle body 10 relative to the left and right rear wheels W3, W4.

Conversely, if both or one of the front lowering flag FD and the rear lowering flag RD has been set to "1", the electric motor 21 is stopped by the process of steps 402, 404 since the front raising flag FU and the rear raising flag RU are maintained at "0". Therefore, the hydraulic pump 22 does not eject hydraulic fluid, so that the discharge valve 27 is maintained in the conveying state. If the front lowering flag FD is "1", the leveling valve 25 is energized by the process of steps 408, 412, so that hydraulic fluid is discharged from the hydraulic cylinders 11a, 11b into the reservoir 23 through the fluid passages P1, P2, P6, P5 and the discharge valve 27. Therefore, the positions of the vehicle body 10 relative to the left and right front wheels W1, W2 start to lower. If the rear lowering flag RD is "1", the leveling valve 26 is energized by the process of steps 414, 418, so that hydraulic fluid is discharged from the hydraulic cylinders 11c, 11d into the reservoir 23 through the fluid passages P3, P4, P7, P5 and the discharge valve 27. Therefore, the positions of the vehicle body 10 relative to the left and right rear wheels W3, W4 start to lower.

When the entire vehicle body 10 or a portion thereof starts to rise or lower through the operation described above, the microcomputer 30 makes a negative determination in step 304 in FIG. 4 since the changing flag CF has been set to "1" by execution of step 310. Therefore, the microcomputer 30 starts executing a change ending control routine of step 312. In the change ending control routine, the microcomputer 30 compares the target vehicle heights Hf*, Hr* and the actual vehicle heights Hf, Hr of the front and rear portions of vehicle body 10 while the vehicle height is being increased or reduced. When the actual vehicle height Hf becomes substantially equal to the target vehicle height Hf* or when the actual vehicle height Hr becomes substantially equal to the target vehicle height Hr*, the corresponding one of the flags FU, FD, RU and RD, that is, the flag corresponding to the actual vehicle height Hf or Hr that has substantially reached the target vehicle height Hf* or Hr*, is set back to "0". When all the flags FU, FD, RU and RD have been set back to "0", the microcomputer 30 makes an affirmative determination in step 314, and sets the changing flag CF back to "0" in step 316. In short, if both the front raising flag FU and the rear raising flag RU are set to "1", or if both the front lowering flag FD and the rear lowering flag RD are set to "1", only the flag regarding the portion of the vehicle body 10 where the actual vehicle height Hf or Hr has become substantially equal to the target vehicle height Hf* or Hr* is set back to "0", while the flag regarding the portion where the actual vehicle height Hf or Hr has not become substantially equal to the target vehicle height Hf* or Hr* is maintained at "1". After the actual vehicle heights Hf and Hr of the front and rear portions of the vehicle body 10 have become substantially equal to the respective target vehicle heights Hf* and Hr*, the changing flag CF is set back to "0". In this operation, however, if both actual vehicle heights Hf, Hr of the front and rear portions of the vehicle body 10 have simultaneously become substantially equal to the respective target vehicle heights Hf*, Hr*, both flags are immediately set back to "0", and the changing flag CF is also set back to "0".

After all of the front raising flag FU, the front lowering flag FD, the rear raising flag RU and the rear lowering flag RD have been set back to "0", the vehicle heights of the vehicle body 10 at the individual wheel positions are maintained at the target vehicle heights by execution of the drive control program of FIG. 5, as in the initial operation described above.

By the operation described above, the vehicle height adjustment is stated if the absolute value |ΔHf| of the vehicle height deviation ΔHf of the front portion of the vehicle body 10 continues to be greater than the threshold Hth1 so that the accumulated value ΔHfa exceeds the predetermined value ΔH1, or if the absolute value |ΔHr| of the vehicle height deviation ΔHr of the rear portion of the vehicle body 10 continues to be greater than the threshold Hth2 so that the accumulated value ΔHra exceeds the predetermined value ΔH2. In this manner, the actual vehicle height Hf or Hr of the front or rear portion of the vehicle body 10 is adjusted to the target vehicle height Hf* or Hr*.

Next described will be operations performed in a case where the forward-backward acceleration Gx is greater than the predetermined value G1 but not greater than the predetermined value G2. In this case, the state flag SF is set to "1" by the processings of steps 108, 110, 114 in the main program of FIG. 2. Therefore, in the start determining routine of FIG. 3, the microcomputer 30 makes a negative determination in step 202, so that the process of steps 204–222 is skipped. When the vehicle height changing routine of FIG. 4 is executed, the microcomputer 30 makes a negative determination in step 302, so that the vehicle height changing control is performed as in the case where the state flag SF has been set to "0".

Therefore, in this case, the determination for a start of vehicle height adjustment is prevented while the vehicle height changing control is not prevented. That is, if vehicle height adjustment is started in the case where the state flag SF has been set to "0", the vehicle height adjustment is continued until the actual vehicle heights Hf, Hr of the front and rear portions of the vehicle body 10 become substantially equal to the target vehicle heights Hf*, Hr*. However, in this case, a new operation of the vehicle height adjustment will not be started.

Next described will be operations performed in a case where the forward-backward acceleration Gx is greater than the predetermined value G2. In this case, the state flag SF is set to "2" by the processings of steps 108, 110, 116 in the main program of FIG. 2, as described above. Therefore, in the start determining routine of FIG. 3, the microcomputer 30 makes a negative determination in step 202, so that the process of steps 204–222 is skipped.

When the vehicle height changing routine of FIG. 4 is executed, the microcomputer 30 makes a affirmative determination in step 302, and proceeds to a change suspension control processing of step 318. In the change suspension control processing, all of the front raising flag FU, the front lowering flag FD, the rear raising flag RU and the rear lowering flag RD, which are used to raise and lower the front and rear portions of the vehicle body 10 in the drive control program of FIG. 5, are set back to "0". Therefore, the next time the drive control program of FIG. 5 is executed, the changing control is entirely suspended even if the vehicle height of the front or rear portion of the vehicle body 10 is being changed. After execution of step 318, it is determined in step 320 whether the changing flag CF is "1". If it is "1", the changing flag CF is changed to "0" in step 322. In addition, the change start flag CS is set to "1" in step 322. Therefore, in a case where the changing flag CF has been set to "1" for a vehicle height changing control operation performed before the suspension of the vehicle height change, the vehicle height changing control is restarted by the process of step 304–310 after the forward-backward acceleration Gx has decreased to or below the predetermined value G2 so that the state flag SF has been set "1" or "0".

As can be understood from the above description, if the forward-backward acceleration Gx of the vehicle is greater than the predetermined value G1, the determination for starting vehicle height adjustment is prevented by the determining processing of step 202 in the start determining routine of FIG. 3, so that vehicle height adjustment will not be started. Therefore, even if the predetermined value G2 is set to a relatively large value in order to reduce the frequency of the suspension and restart of vehicle height adjustment in response to a change in the forward-backward acceleration Gx, the frequency of the performance of vehicle height adjustment in response to a change in the vehicle height caused by a change in the forward-backward acceleration Gx can be reduced. Consequently, this embodiment reduces the frequency of switching operations of actuators, such as the electric motor 21, the hydraulic pump 22, the hydraulic cylinders 11a–11d and the like, and therefore reduces the incidence of noises produced during the switching of actuators. Furthermore, good durability or long service life of the actuators will be achieved.

First Modification

Figure 6:
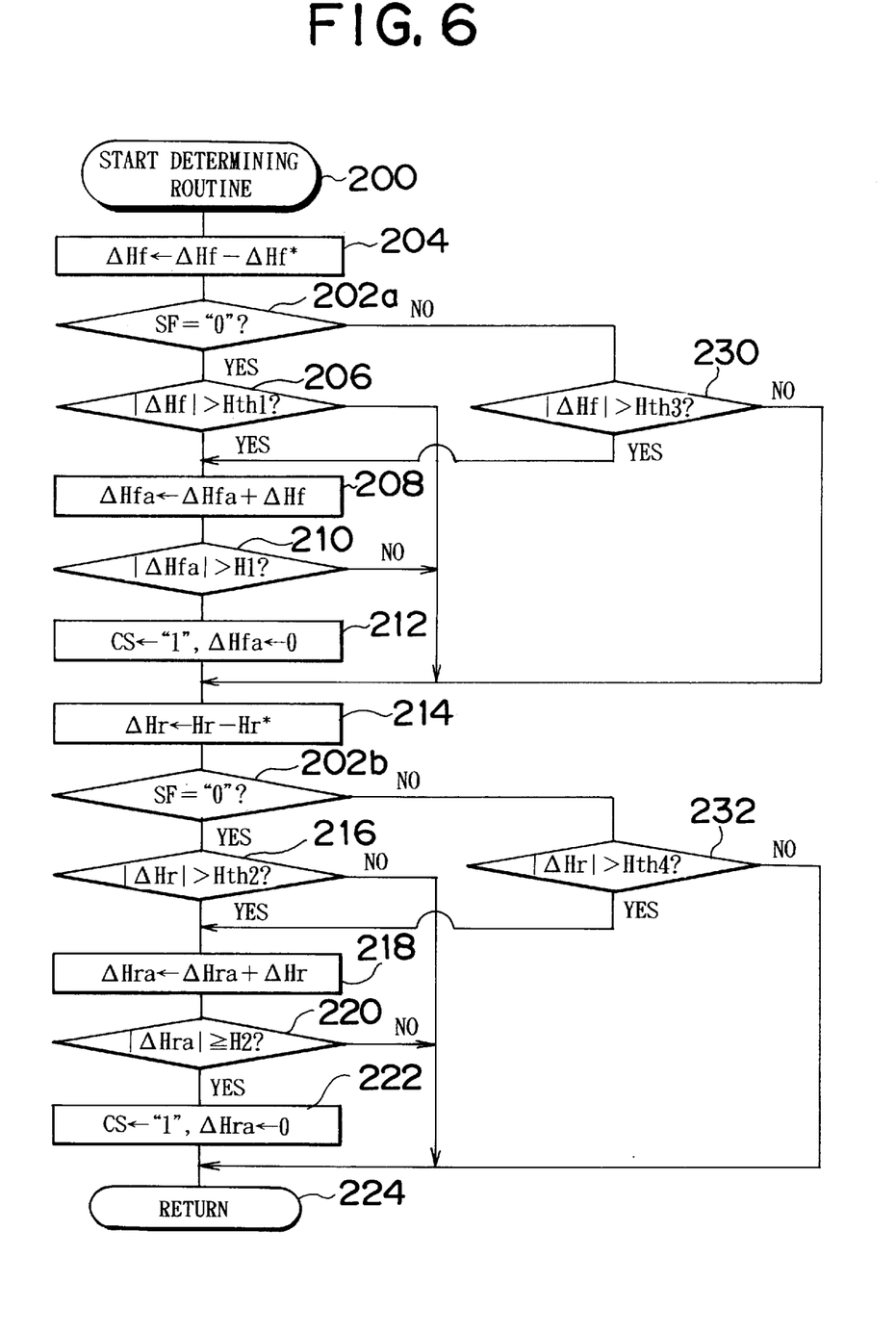
FIG. 6 is a flowchart illustrating the start determining routine according to a first modification.

A first modification of the foregoing embodiment will be described. In the first modification, the start determining routine of FIG. 3 is modified as illustrated in FIG. 6. That is, the determining processing of step 202 in FIG. 3 is omitted, and steps 202a, 202b performing the same determining processing as the processing of step 202 are provided between steps 204 and 206 and between steps 214 and 216. If a negative determination is made in steps 202a, 202b, the determining processings of steps 230, 232 are executed, respectively. More specifically, if it is determined in steps 202a, 202b that the state flag SF is not "0"(that is, the forward-backward acceleration Gx is greater than the predetermined value G1), it is then determined in steps 230, 232 whether the absolute values $|\Delta Hf|$, $|\Delta Hr|$ of the vehicle height deviations $\Delta Hf$, $\Delta Hr$ are greater than positive thresholds Hth3, Hth4, respectively. If the absolute values $|\Delta Hf|$, $|\Delta Hr|$ are greater the thresholds Hth3, Hth4, the determination in steps 230, 232 is affirmative, and the program operation proceeds to the accumulating processings of steps 208, 218, respectively. Conversely, if the absolute values $|\Delta Hf|$, $|\Delta Hr|$ are not greater than the thresholds Hth3, Hth4, the determination in steps 230, 232 is negative, and the program operation proceeds to steps 214, 224, skipping the process of steps 208–212 and steps 218–222 respectively. In this routine, the thresholds Hth3, Hth4 are greater than the thresholds Hth1, Hth2 used for comparison in steps 206, 216, respectively.

In this routine, if the forward-backward acceleration Gx is greater than the predetermined value G1, that is, if the state flag SF has been set to "1" or "2", the absolute values $|\Delta Hf|$, $|\Delta Hr|$ of the vehicle height deviations $\Delta Hf$, $\Delta Hr$ are not accumulated unless the absolute values $|\Delta Hf|$, $|\Delta Hr|$ are greater than the thresholds Hth3, Hth4, which are greater than the thresholds Hth1, Hth2, respectively. That is, the values (thresholds) used for comparison with the values indicating the amounts of deviation of the front and rear portions of the vehicle body 10 are greater in a case where the state flag SF is "1" or "2" than in case where the state flag SF is "0". In this manner, the determination for a start of the vehicle height adjustment of the front and rear portions of the vehicle body 10 becomes less likely to be made in the case where the state flag SF is "1" or "2" than in the case where the state flag SF is "0". Consequently, the first modification restricts the start of the vehicle height adjustment of the front and rear portions of the vehicle body 10 if the forward-backward acceleration Gx is greater than the predetermined level (G1), thereby achieving substantially the same advantages as achieved by the foregoing embodiment.

Second Modification

Figure 7:
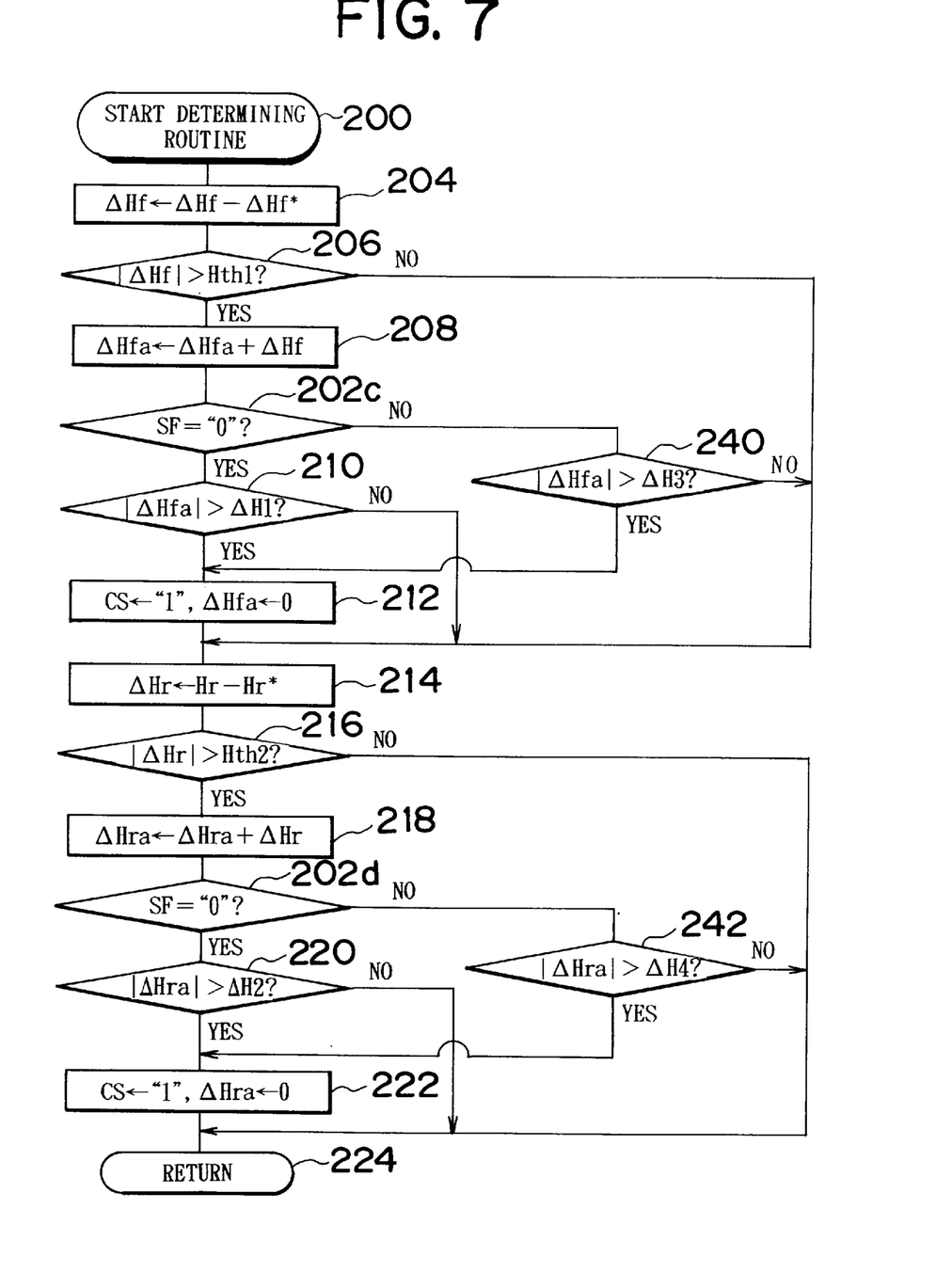
FIG. 7 is a flowchart illustrating the start determining routine according to a second modification.

A second modification of the foregoing embodiment will be described. In the second modification, the start determining routine of FIG. 3 is modified as illustrated in FIG. 7. That is, the determining processing of step 202 in FIG. 3 is omitted, and steps 202c, 202d performing the same determining processing as the processing of step 202 are provided between steps 208 and 210 and between steps 218 and 220. If a negative determination is made in steps 202c, 202d, the determining processing of steps 240, 242 are executed, respectively. More specifically, if it is determined in steps 202c, 202d that the state flag SF is not "0" (that is, the forward-backward acceleration Gx is greater than the predetermined value G1), it is then determined in steps 24, 242 whether the absolute values $|\Delta Hfa|$, $|\Delta Hra|$ of the accumulated values $\Delta Hfa$, $\Delta Hra$ are greater than positive predetermined values $\Delta H3$, $\Delta H4$, respectively. If the absolute values $|\Delta Hfa|$, $|\Delta Hra|$ of the accumulated values $\Delta Hfa$, $\Delta Hra$ are greater than positive predetermined values $\Delta H3$, $\Delta H4$, the determination in steps 240, 242 is affirmative, and the program operation proceeds to steps 212, 222, respectively. In steps 212, 222, the change start flag CS is set to "1". Conversely, if the absolute values $|\Delta Hfa|$, $|\Delta Hra|$ of the accumulated values $\Delta Hfa$, $\Delta Hra$ are not greater than positive predetermined values $\Delta H3$, $\Delta H4$, the determination in steps 240, 242 becomes negative, and the program operation proceeds to steps 214, 224, skipping steps 212, 222, respectively. In this routine, the predetermined values $\Delta H3$, $\Delta H4$ are greater than the predetermined values $\Delta H1$, $\Delta H2$ used for comparison in steps 210, 222, respectively.

In this routine, if the forward-backward acceleration Gx is greater than the predetermined value G1, that is, if the state flag SF has been set to "1" or "2", the change start flag CS is not set to "1" unless the absolute values $|\Delta Hfa|$, $|\Delta Hra|$ of the accumulated values $\Delta Hfa$, $\Delta Hra$ become greater than the positive predetermined values $\Delta H3$, $\Delta H4$, respectively. The absolute values $|\Delta Hfa|$, $|\Delta Hra|$ of the accumulated values $\Delta Hfa$, $\Delta Hra$ also indicate the amounts of deviation of the front and rear portions of the vehicle body 10. Therefore, in this routine, too, the comparison values used for comparison with the values indicating the amounts of deviation of the front and rear portions are greater in the case where the state flag SF is "1" or "2" than in the case where the state flag SF is "0". In this manner, the determination for a start of the vehicle height adjustment of the front and rear portions of the vehicle body 10 becomes less likely to be made in the case where the forward-backward acceleration Gx is greater than the predetermined value G1. Consequently, the second modification restricts the start of the vehicle height adjustment of the front and rear portions of the vehicle body 10 if the forward-backward acceleration Gx is greater than the predetermined level (G1), thereby achieving substantially the same advantages as achieved by the foregoing embodiment.

Third Modification

Figure 8:
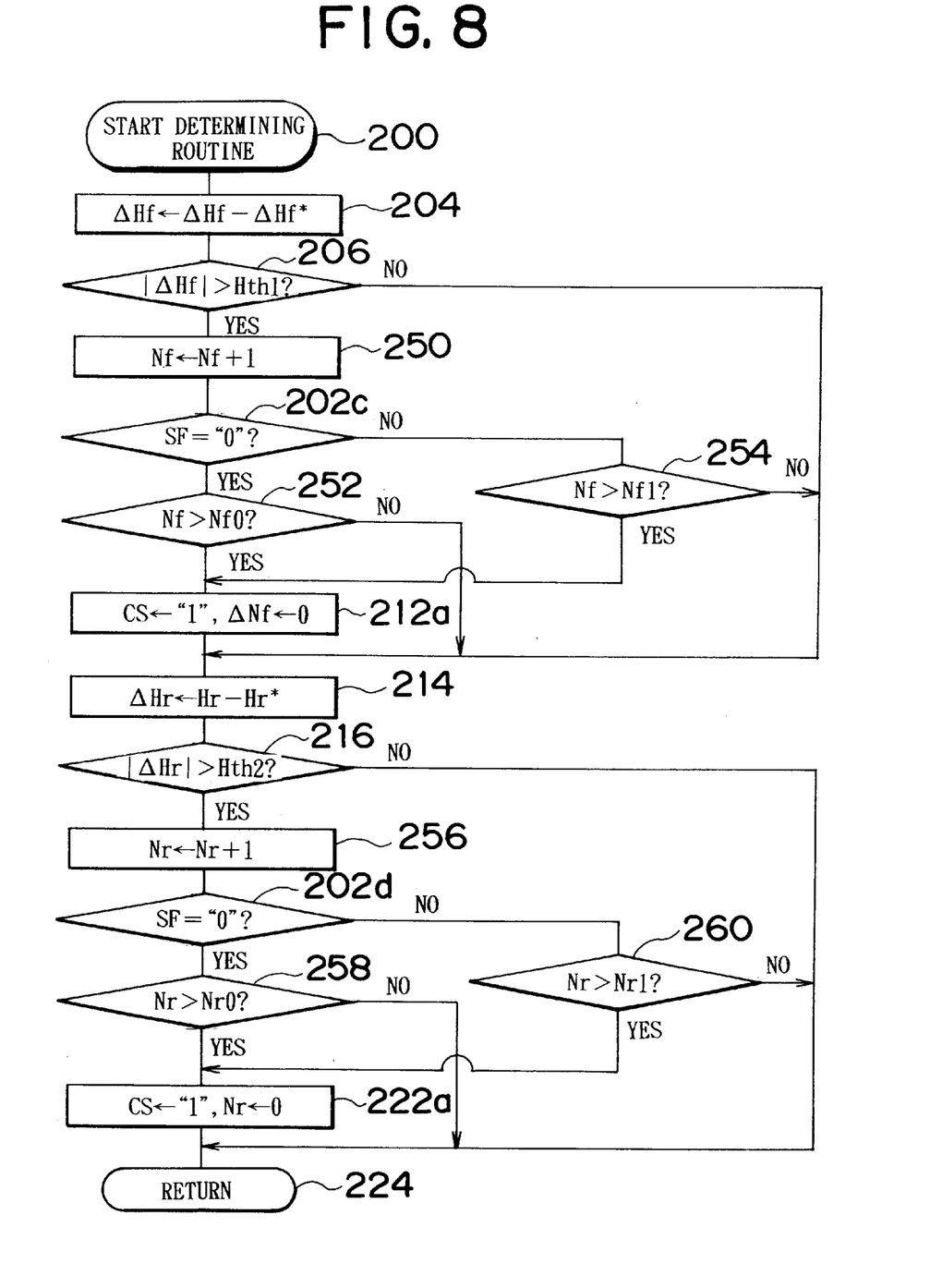
FIG. 8 is a flowchart illustrating the start determining routine according to a third modification.

A third modification of the foregoing embodiment will be described. In the third modification, the start determining routine in the second modification of FIG. 7 is modified as illustrated in FIG. 8. That is, steps 208, 210, 240, 212 and steps 218, 220, 242, 222 in FIG. 7 are replaced by steps 250, 252, 254, 212a and steps 256, 258, 260, 222a in FIG. 8, respectively. The third modification counts the number of times that the absolute values |ΔHf|, |ΔHr| of the actual vehicle heights Hf, Hr of the front and rear portions of the vehicle body 10 have exceeded the thresholds Hth1, Hth2, respectively, and starts the vehicle height adjust control when either count value exceeds a predetermined number.

If the absolute values |ΔHf|, |ΔHr| of the vehicle height deviations ΔHf, ΔHr are equal to or less than the thresholds Hth1, Hth2, the microcomputer 30 makes a negative determination in steps 206, 216 and proceeds to steps 214, 224, respectively, as in the second modification. Conversely, if the absolute values |ΔHf|, |ΔHr| of the vehicle height deviations ΔHr, ΔHr are greater than the thresholds Hth1, Hth2, the microcomputer 30 makes an affirmative determination in steps 206, 216, and then adds 1 to count values Nf, Nr in steps 250, 256, respectively. Subsequently, if the state flag SF is "0", the microcomputer 30 makes an affirmative determination in steps 202c, 202d, and then determines in steps 252, 258 whether the count values Nf, Nr are greater than positive predetermined values Nf0, Nr0, respectively. Conversely, if the state flag SF is "1" or "2", the microcomputer 30 makes a negative determination in steps 202c, 202d, and determines in steps 254, 260 whether the count values Nf, Nr are greater than positive predetermined values Nf1, Nr1, respectively. The positive predetermined values Nf1, Nr1 are greater than the predetermined values Nf0, Nr0, respectively.

If it is determined in step 252 or 254 that the count value Nf is not greater than the predetermined value Nf0 or Nf1 (NO in step 252 or 254), the program operation proceeds to step 214. Conversely, if it is determined in step 252 or 254 that the count value Nf is greater than the predetermined value Nf0 or Nf1 (YES in step 252 or 254), the microcomputer 30 sets the change start flag CS to "1" and clears the predetermined value Nf to 0 in step 212a. If it is determined in step 258 or 260 that the count value Nr is not greater than the predetermined value Nr0 or Nr1 (NO in step 258 or 260), the program operation proceeds to step 224. Conversely, if it is determined in step 258 or 260 that the count value Nr is greater than the predetermined value Nr0 or Nr1 (YES in step 258 or 260), the microcomputer 30 sets the change start flag CS to "1" and clears the predetermined value Nr to 0 in step 222a.

Therefore, if the forward-backward acceleration Gx is greater than the predetermined value G1, the change start flag CS is not set to "1" unless the count value Nf or Nr becomes greater than the predetermined value Nf1 or Nr1, which is greater than the corresponding positive predetermined value used in the case where the forward-backward acceleration Gx is equal to or less than the predetermined value G1. The count values Nf, Nr also indicate the amounts of deviation of the front and rear portions of the vehicle body 10. Therefore, in this routine, too, the comparison values used for comparison with the values indicating the amounts of deviation of the front and rear portions of the vehicle body 10 are greater in the case where the forward-backward acceleration Gx is greater than the predetermined value G1 than in the case where the forward-backward acceleration Gx is equal to or less than the predetermined value G1. In this manner, the determination for a start of the vehicle height adjustment of the front and rear portions of the vehicle body 10 becomes less likely to be made in the case where the forward-backward acceleration Gx is greater than the predetermined value G1. Consequently, the third modification restricts the start of the vehicle height adjustment of the front and rear portions of the vehicle body 10 if the forward-backward acceleration Gx is greater than the predetermined level (G1), thereby achieving substantially the same advantages as achieved by the foregoing embodiment.

Although in the third modification, the absolute values |ΔHf|, |ΔHr| of the vehicle height deviations ΔHf, ΔHr are compared with the thresholds Hth1, Hth2, respectively, regardless of the set value of the state flag SF, it is also possible to compare the absolute values |ΔHf|, |ΔHr| with the thresholds Hth1, Hth2, respectively, if the state flag SF is "0", and to compare the absolute values |ΔHf|, |ΔHr| with the thresholds Hth3, Hth4, respectively, if the state flag SF is "1" or "2", wherein Hth1<Hth3, and Hth2<Hth4, as in the first modification. In this procedure, too, the comparison values used for comparison with the values indicating the amounts of deviation of the front and rear portions of the vehicle body 10 are greater in the case where the state flag SF is "1" or "2" than in the case where the state flag SF is "0". Therefore, this procedure additionally restricts the start of the vehicle height adjustment of the front and rear portions of the vehicle body 10 if the forward-backward acceleration Gx is greater than the predetermined value G1.

Fourth Modification

A fourth modification on the foregoing embodiment will be described. In the fourth modification, a steering angle sensor 34 for detecting a steering angle θ of the left and right front wheels W1, W2 (the steering wheel) is added to the apparatus construction according to the foregoing embodiment, as indicated by broken lines in FIG. 1. In this modification, the microcomputer 30 executes a main program illustrated in FIG. 9, instead of the main program of the foregoing embodiment illustrated in FIG. 2.

Figure 9:
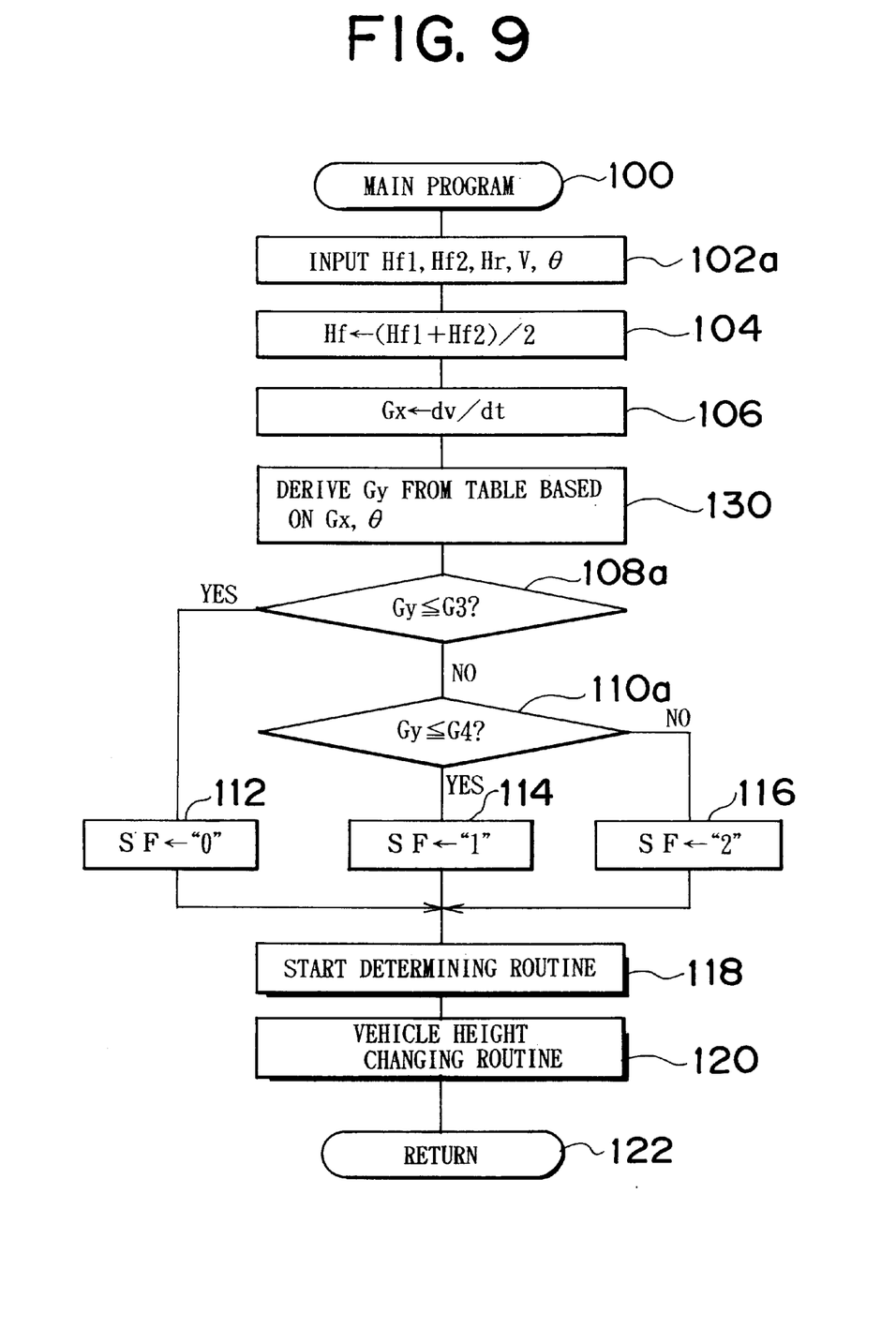
FIG. 9 is a flowchart illustrating the main program according to a fourth modification.

In the main program of FIG. 9, the microcomputer 30 receives, in steps 102a, inputs of a detection signal indicating a steering angle θ detected by the steering angle sensor 34 and detection signals indicating the actual vehicle heights Hf1, Hf2, Hr and the vehicle speed V. After steps 104, 106, the microcomputer 30 derives, in step 130, a lateral acceleration Gy of the vehicle corresponding to the steering angle θ inputted in step 102a and the forward-backward acceleration Gx calculated in step 106, by referring to a table on the basis of the steering angle θ and the forward-backward acceleration Gx. The table is provided beforehand in the microcomputer 30 in the form of a three-dimensional map wherein the lateral acceleration Gy increases with respective increases of the steering angle θ and the forward-backward acceleration Gx. The lateral acceleration Gy may also be determined by calculation, or by using a sensor for detecting the lateral acceleration Gy.

After step 130, the microcomputer 30 detects a state of the vehicle based on the lateral acceleration Gy, and sets the state flag SF, which indicates the detected state, to the corresponding one of "0", "1" and "2", in the process of steps 108*a*, 110*a*, 112–116. If the lateral acceleration Gy is equal to or less than a positive predetermined value G3, the state flag SF is set to "0". If the lateral acceleration Gy is greater than predetermined value G3 but not greater than a positive predetermined value G4, the state flag SF is set to "1". If the lateral acceleration Gy is greater than the predetermined value G4, the state flag SF is set to "2". The predetermined values G3, G4 are predetermined so that the relationship G4>G3 is established. Other steps in the main program of FIG. 9 are substantially the same as those in the foregoing embodiment.

Therefore, in the modification, the state flag SF is set to "0", "1" and "2" in that order with increases with the lateral acceleration Gy, which cause changes in the vehicle heights of the front and rear portions of the vehicle body 10. Consequently, the fourth modification also achieves substantially the same advantages as achieved by the foregoing embodiment.

It is also possible to use both the forward-backward acceleration Gx and the lateral acceleration Gy as bases for setting the state flag SF. In this case, the state flag SF may be set as follows. That is, the state flag SF is set to "2" if at least one of the accelerations Gx, Gy exceeds the corresponding one of the predetermined values G2, G4. The state flag SF is set to "1" if both accelerations Gx, Gy are equal to or less than the predetermined values G2, G4, respectively, but at least one of the accelerations Gx, Gy is greater than the corresponding one of the predetermined values G1, G3. The state flag SF is set to "0" if both accelerations Gx, Gy are equal to or less than the predetermined values G1, G3, respectively.

Furthermore, although in the fourth modification, the forward-backward acceleration Gx and the lateral acceleration Gy are used as physical quantities representing movements of the vehicle that change the vehicle posture, it is also possible to use both or one of the time differentials dGx/dt and dGy/dt instead of the accelerations Gx, Gy.

Other Modifications

Although in the foregoing embodiment and the various modifications, two vehicle height sensors are provided in the front portion of the vehicle body 10 and one vehicle height sensor is provided in the rear portion thereof, it is also possible to provide one vehicle height sensor in each of the front and rear portions of the vehicle body 10 and to detect the actual vehicle heights Hf, Hr of the front and rear portions of the vehicle body 10 using the respective sensors. It is also possible to provide one vehicle height sensor at each of the left and right rear wheels W3, W4, and to detect the vehicle height of the rear portion of the vehicle body 10 by averaging the vehicle heights detected by the two sensors. Furthermore, although the foregoing embodiment performs control such that the actual vehicle heights Hf, Hr of the front and rear portions of the vehicle body 10 are set to the respective target vehicle heights Hf*, Hr*, it is also possible to set the vehicle heights of the vehicle body 10 at the individual wheel positions to their respective target vehicle heights.

Although in the foregoing embodiment, the invention is applied to a hydraulic vehicle height adjust apparatus, the invention may also be applied to vehicle height adjust apparatuses employing other types of fluids, for example, a pneumatic vehicle height adjust apparatus using air. In the application to a pneumatic vehicle height adjust apparatus, the hydraulic pump 22 and the hydraulic cylinders 11*a*–11*d* are replaced by a pneumatic pump and pneumatic cylinders, and the various valves 25–28 and the like are also replaced by pneumatic valves and the like.

While the present invention has been described with reference to what is presently considered to be a preferred embodiment thereof, it is to be understood that the invention is not limited to the disclosed embodiment or constructions. To the contrary, the invention is intended to cover other various modifications and equivalent arrangements.

What is claimed is:

1. A vehicle height adjust control apparatus comprising:

an actuator capable of changing a height of a vehicle;

a vehicle height detector that detects a vehicle height;

a start determiner that makes a determination that vehicle height adjustment is to be started if an amount of deviation of the vehicle height detected by the vehicle height detector from a target vehicle height increases to a predetermined level;

a vehicle height changer that changes the vehicle height by controlling the actuator so that the vehicle height detected by the vehicle height detector becomes substantially equal to the target vehicle height when the determination that vehicle height adjustment is to be started is made by the start determiner;

a physical quantity detector that detects a physical quantity that indicates a movement of the vehicle that changes a posture of the vehicle, wherein the physical quantity is other than the vehicle height;

a start determination preventor that prevents the start determination from being made by the start determiner if the physical quantity detected by the physical quantity detector is greater than a first predetermined value; and a stopper that stops the changing of the vehicle height by the vehicle height changer if the physical quantity detected by the physical quantity detector is greater than a second predetermined value that is greater than the first predetermined value.

2. The vehicle height adjust control apparatus according to claim 1, wherein the physical quantity is an acceleration of the vehicle in at least one of a forward-backward direction and a lateral direction.

3. The vehicle height adjust control apparatus according to claim 1, wherein the start determiner compares a value indicating the amount of deviation of the vehicle height detected by the vehicle height detector from the target vehicle height with a third predetermined value and, when the value indicating the amount of deviation becomes greater than the third predetermined value, it is determined that vehicle height adjustment is to be started, and the start determination preventor includes a comparison preventor that prevents comparison of the value indicating the amount of deviation with the third predetermined value from being performed by the start determiner if the physical quantity detected by the physical quantity detector is greater than the first predetermined value.

4. The vehicle height adjust control apparatus according to claim 3, wherein the physical quantity is an acceleration of the vehicle in at least one of a forward-backward direction and a lateral direction.

5. A vehicle height adjust control apparatus comprising:

an actuator capable of changing a height of a vehicle;

a vehicle height detector that detects a vehicle height;

a start determiner that compares a value indicating an amount of deviation of the vehicle height detected by the vehicle height detector from a target vehicle height with a third predetermined value, and that makes a determination that vehicle height adjustment is to be started when the value indicating the amount of deviation becomes greater than the third predetermined value;

a vehicle height changer that changes the vehicle height by controlling the actuator so that the vehicle height detected by the vehicle height detector becomes substantially equal to the target vehicle height when the determination that vehicle height adjustment is to be started is made by the start determiner;

a physical quantity detector that detects a physical quantity that indicates a movement of the vehicle that changes a posture of the vehicle, wherein the physical quantity is other than the vehicle height;

a comparison value changer that, if the physical quantity detected by the physical quantity detector is greater than a first predetermined value, changes the third predetermined value to a value that is greater than a value that is set as the third predetermined value when the physical quantity is equal to or less than the first predetermined value; and a stopper that stops the changing of the vehicle height by the vehicle height changer if the physical quantity detected by the physical quantity detector is greater than a second predetermined value that is greater than the first predetermined value.

6. The vehicle height adjust control apparatus according to claim 5, wherein the physical quantity is an acceleration of the vehicle in at least one of a forward-backward direction and a lateral direction.

7. A method of controlling an adjustment of a height of a vehicle, the method comprising:

detecting a vehicle height;

determining that a vehicle height adjustment is to be started if an amount of deviation of the vehicle height from a target vehicle height increases to a predetermined level;

changing the vehicle height by controlling an actuator so that the vehicle height becomes substantially equal to the target vehicle height when the determination is made that vehicle height adjustment is to be started;

detecting a physical quantity that indicates a movement of the vehicle that changes a posture of the vehicle, wherein the physical quantity is other than the vehicle height;

preventing the start determination from being made if the physical quantity is greater than a fist predetermined value; and stopping the changing of the vehicle height if the physical quantity is greater than a second predetermined value that is greater than the first predetermined value.

8. The method of claim 7, wherein the physical quantity is an acceleration of the vehicle in at least one of a forward-backward direction and a lateral direction.

9. The method of claim 7, wherein a previously started ongoing vehicle height change is permitted to continue if the physical quantity is greater than the first predetermined value and less than the second predetermined value.

10. The method of claim 9, wherein the physical quantity is an acceleration of the vehicle in at least one of a forward-backward direction and a lateral direction.

11. A method of controlling an adjustment of a height of a vehicle, the method comprising:

detecting a vehicle height;

comparing a value indicating an amount of deviation of the vehicle height from a target vehicle height with a third predetermined value;

determining that vehicle height adjustment is to be started when the value indicating the amount of deviation becomes greater than the third predetermined value;

changing the vehicle height by controlling an actuator so that the vehicle height becomes substantially equal to the target vehicle height when the determination is made that vehicle height adjustment is to be started;

detecting a physical quantity that indicates a movement of the vehicle that changes a posture of the vehicle, wherein the physical quantity is other than the vehicle height;

if the physical quantity detected is greater than a first predetermined value, changing the third predetermined value to a value that is greater than a value that is set as the third predetermined value if the physical quantity is equal to or less than the first predetermined value; and stopping the changing of the vehicle height if the physical quantity detected is greater than a second predetermined value that is greater than the first predetermined value.

12. The method of claim 11, wherein the physical quantity is an acceleration of the vehicle in at least one of a forward-backward direction and a lateral direction.

* * * * *